Patented May 2, 1939

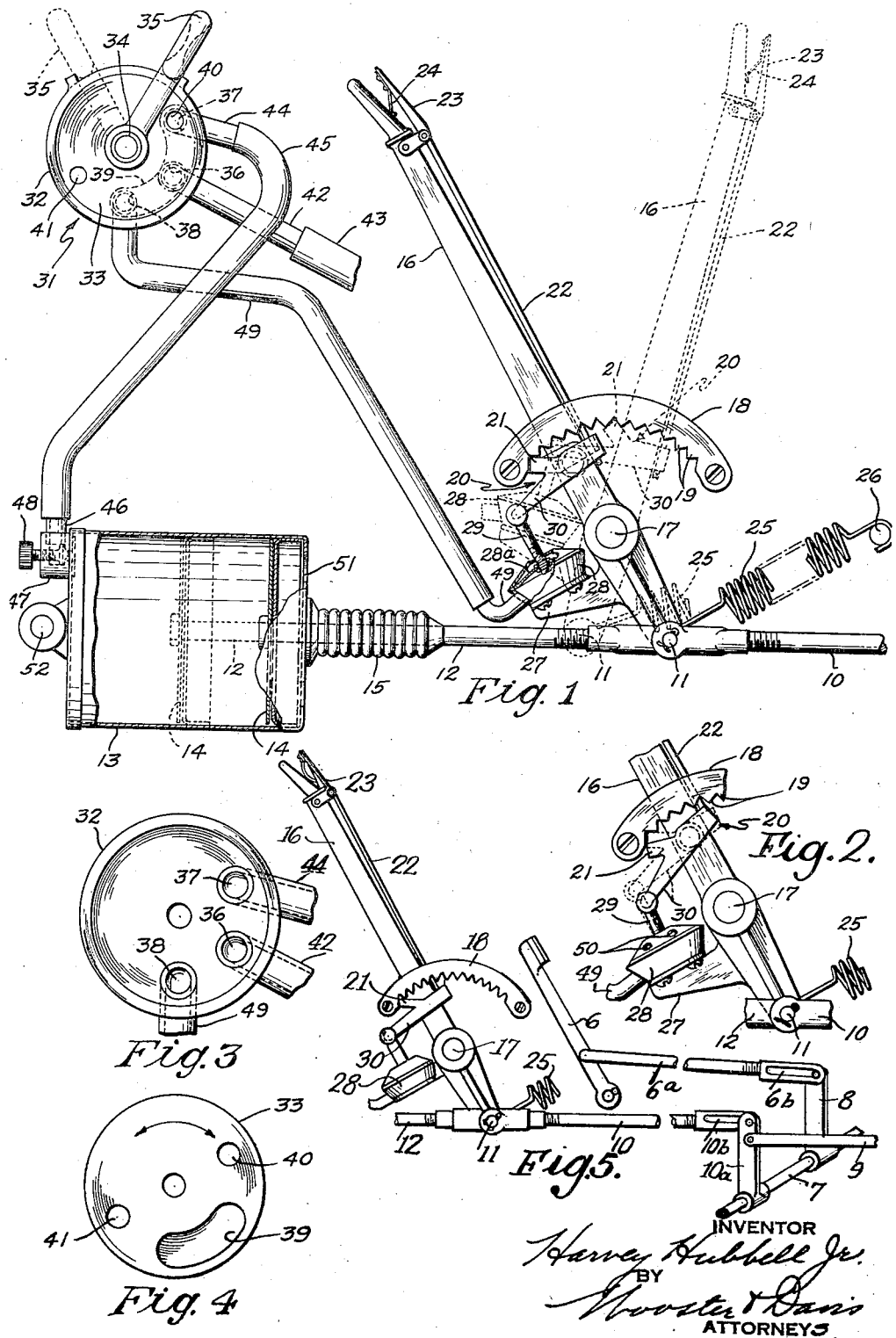

2,156,290

UNITED STATES PATENT OFFICE 2,156,290

VACUUM CONTROLLED EMERGENCY BRAKE OPERATING DEVICE

Harvey Hubbell, Jr., Bridgeport, Conn.

Application January 30, 1936, Serial No. 61,500

10 Claims. (Cl. 188—152)

This invention relates to new and useful improvements in vehicle braking mechanism and has particular relation to a vacuum controlled emergency or parking brake operating device.

An object of the invention is to provide means whereby the hand or parking brake of an automobile may be either or both applied and released without any particular manual effort.

Another object is to provide a simple and reliable means for either applying or releasing the hand brake of an automobile.

Other objects and advantages will become apparent from a consideration of the following detailed description taken in connection with the accompanying drawing wherein there is shown a satisfactory embodiment of the invention. However, it is to be understood that the invention is not limited to the details disclosed but includes all such variations and modifications as fall within the spirit of the invention and the scope of the appended claims.

In the drawing:

Fig. 1 is an elevational view with parts broken away and showing a hand brake operating means constructed according to the present invention;

Fig. 2 is a detail elevational view showing the operation of a pawl or catch employed;

Fig. 3 is an elevational view of a valve casing employed;

Fig. 4 is a similar view of a disc valve removed from the casing; and

Fig. 5 is a perspective view showing a foot pedal associated with the hand lever for service for operation of the brakes.

Referring in detail to the drawing at 10 is shown a brake rod adapted to be shifted longitudinally first in one direction and then in the other to apply and release the vehicle emergency or parking brakes (not shown), and which on some cars are the service brakes and on others are brakes separate from the service brakes. Secured to rod 10 by a pivot or bolt 11 is a second rod or a link 12 having an end extending into a cylinder 13 and therein carrying or being attached to a piston 14. The piston is adapted to be reciprocated in the cylinder as will later be described, and about that portion of the link 12 which will be moved into and out of the cylinder there is arranged a covering or collapsible boot 15 of leather, rubber or other suitable flexible material.

The usual hand lever 16 is pivotally mounted intermediate its ends at 17 and the lower end portion of the lever is connected to shift the rod 10 as by being connected with the pivot 11. The full lines in Fig. 1 show this lever in the position occupied by it when the vehicle emergency or parking brakes are released, and the dotted lines show the lever in a position as when these brakes are applied. Thus it will be understood that the lever 16 is the usual hand or parking brake lever of an automobile and that it is swung about its pivot 17 to apply and release the vehicle parking or emergency brake as is usually the case.

This parking lever is used with the usual service operating mechanism of the brakes such as the usual foot pedal 6, this pedal 6 and lever 16 being connected to the brakes in any of the usual manners to permit application of the brakes by either lever independently of the other. Thus rod 10 may be pivotally connected to an arm 10a on a shaft on which is also connected an arm 8 to which is connected a rod 6a from pedal 6. From 10a may lead a rod or cable 9 for operating the brakes. Rods 10 and 6a may be connected to their respective arms 10a and 8 by a lost motion connection such as a pin in slots 10b and 6b to permit operation of the brakes by either the pedal 6 or lever 16 independently of the other.

Associated with the lever 16 is a stationary rack 18 having the rack teeth 19 as usual, and pivotally mounted on the lever is a pawl 20 having a tooth or branch 21 adapted to enter any one of the teeth of the rack 18 so as to hold the lever, and through the lever the brake rod 10, in any adjusted or applied position. A bar 22 on the lever 16 has its lower end connected with the pawl 20, and a hand piece 23 on the upper end of such bar is adapted to be squeezed toward the lever against the action of a spring 24 so as to rock the pawl about its pivot and carry its tooth 21 out from engagement with a tooth of the rack 18. The normal tendency of the spring 24 is to shift the bar 22 so as to keep the pawl in position with its tooth in engagement with one of the teeth of the rack.

A relatively heavy coil spring 25 has one end connected to the bolt 11 or to some other part movable with the rod 10, and this spring is constantly tending to shift the rod and the hand lever in a direction to release the vehicle parking brakes. The outer end of the spring is secured to a fixed part as the pin 26. When the lever is in the dotted line position with the brakes applied the pawl 20 engaging in one of the teeth of the rack serves to secure or lock the brakes in applied position against the action of the spring 25 and other springs of the brakes tending to release them, and when the piece 23 is rocked to release the pawl from the rack the said spring together with the other springs of the brake will act to shift the rod 10 and the lever 16 and release the vehicle brakes.

Carried by the lever 16 below but adjacent its pivot is an arm 27 on which is mounted a cylinder or casing 28 into which extends a rod 29, within the cylinder connected with a piston or diaphragm 28a. The outer end of rod 29 is connected with an extension 30 of the pawl 20 and it will be clear that movement may be imparted to the pawl through the said rod 29.

A valve generally designated 31 is conveniently mounted on the automobile dash, or steering wheel or steering wheel column, or the valve may be otherwise mounted as desired or found most convenient. The valve includes a casing 32 within which is turnable a valve disc 33 mounted as by a pivot 34 and adapted to be shifted as by a small hand piece 35. Casing 32 has three openings 36, 37 and 38 while the disc 33 has an elongated recess 39 and two bleed openings 40 and 41. Connected with the opening 36 is a pipe 42 from which a tube 43 extends and is connected with the suction side of an automobile engine (not shown) as by being connected with the intake manifold of the engine, or a tank between the valve and the intake manifold in which a vacuum or reduced pressure less than atmospheric is maintained.

A second pipe 44 through a tube 45 and a nipple 46 is connected by a passage through an enlargement 47 with the interior of the cylinder 13. The size of the passage through the enlargement 47 may be regulated by adjusting a screw valve 48 provided for that purpose. Connected with the opening 38 is one end of a pipe 49 which at its other end is connected with the interior of the cylinder or casing 28 below the piston or diaphragm 28a. This cylinder has air inlet openings 50 in one wall above the diaphragm and the cylinder 13 has an air inlet opening 51 in its forward wall. Preferably "on" and "off" designations are associated with the hand piece 35 of the valve 31 as shown.

Some people, particularly some women, have trouble releasing the hand brake of an automobile, and the present invention provides means for overcoming such difficulties. With the apparatus here disclosed the parking brakes may be applied and released by operating the lever 16 by hand in the usual manner. Also the brakes may be applied and released without the operator touching such lever. This last is accomplished by suction operated means on proper manipulation of the valve 31 as will now be described. Suction operation is preferred, the device being operated by differential pressures as will be understood.

The recess 39 in the valve disc is of such length that when the handle 35 is in the "off" position as shown in Fig. 1 the openings 36 and 38 are in communication through said recess. Therefore a suction from the engine, or vacuum supply tank, through the tube 43 will be communicated to the cylinder 28 through the pipe 49 and the piston or diaphragm in said cylinder will be drawn downwardly moving the rod 29 downwardly to rock the pawl 20 about its pivot so as to shift its tooth 21 out from engagement with a tooth of the rack 18 (see Fig. 2). When this has been accomplished the spring 25 and other springs of the brakes will shift the parts to their normal positions releasing the vehicle brakes. When the valve disc is in this last described position its bleed opening 40 is over the pipe opening 37 so that air is admitted to the cylinder 13 through the passage in the enlargement 47 making it possible for the spring 25 (or other brake springs) to do its work. As the spring 25 so acts the piston 14 in the cylinder 13 functions as a dash pot the passage controlled by valve 48 being a restricted passage.

When the valve handle is shifted to the "on" position the recess 39 places the openings 36 and 37 in communication and the suction from the engine is applied to the interior of the cylinder 13 through the passage in the enlargement 47. As the air is exhausted from the cylinder at one side of the piston 14 the air entering through the inlet or opening 51 forces the piston toward the left in Fig. 1 so that the brake rod 10 is shifted in a direction to apply the vehicle brakes. While the valve disc is in this last mentioned position its bleed opening 41 is over the opening 38 leading through the pipe 49 to the cylinder 28 so that air will be admitted to that cylinder at the under side of the piston or diaphragm therein whereby the pawl is free to engage the teeth of the rack 18 and lock or secure the lever and thus the brake rod 10 in whatever position they are moved by the suction applied to the piston 14.

To again release the brakes the handle 35 is shifted to "off" position and the suction applied to the cylinder 28 so as to rock the pawl away from the teeth of the rack 18 whereupon the spring 25 and brake springs will act as before described.

The cylinder 13 may be mounted on any stationary part of the car by any suitable means such as a pivot 52.

From the foregoing it will be seen that with the present arrangement the parking brake may be applied and released manually in the usual manner by operation of the lever 16 if the power devices fail to function, and such brake may be applied and released without effort by proper manipulation of the valve 31.

Having thus set forth the nature of my invention, what I claim is:

1. In an automobile emergency or parking brake operating mechanism, suction operated means for moving the said brakes to applied positions, a hand operated lever for also applying the brakes, a catch to secure said brakes in applied positions, means tending to move the catch to brake holding position, means to move said brakes to released positions on release of said catch, suction operated means to release said catch, hand operated means on said lever for releasing the catch, and a manually operated valve for controlling both said suction means.

2. In an automobile emergency or parking brake operating means, a hand operated lever for applying the brakes, power operated means for moving the said brakes to applied position, a catch operable to secure said brakes in applied position, means normally retaining said catch in brake securing position, hand operated means on the lever for releasing the catch, power operated means to move said catch to release the brakes, and manually operated control means for both said power means and located in the automobile adjacent said lever.

3. In an automobile emergency or parking brake operating mechanism, a hand operated lever for applying the brakes, power operated means for moving the said brakes to applied position, pawl and rack means for holding said pawl and rack in engagement, hand operated means on the lever to release the pawl, means to move said brakes to released position on release of said pawl, power operated means to release said pawl, and manual means for controlling both the power means and located adjacent the lever in position to be operated by the operator of the lever.

4. In combination with an automobile emergency or parking brake, means including a brake rod, a hand lever located adjacent the driver's position for shifting said rod to apply the said brakes, power means to move said rod to apply said brakes, a catch to hold said rod in position with the brakes applied, means normally retaining said catch in holding position, means on said lever manually operable to release said catch, power means operable to release said catch, and manually operable means to control both the power means and located adjacent the lever in position to be operated by the operator of the lever.

5. In an automobile, an emergency or parking brake operating mechanism operable to set the brake independently of the service brake operating means, a hand lever located to be operated from the driver's position to move the said emergency or parking brake operating mechanism to applied position, means constantly tending to move said latter brake mechanism to released position, a catch to hold the said mechanism in applied position, power means to release said catch, and a manually operable means to control the power means located adjacent said lever in position to be operated by the operator of the lever.

6. In an automobile, an emergency or parking brake operating mechanism operable to set the brake independently of the service brake operating means, a lever manually shiftable to apply the said emergency or parking brake operating mechanism and located for operation from the driver's position, a pawl and rack means for holding the lever in position with the said latter mechanism applied, power means for releasing said pawl and rack means to permit of movement of the lever to release the brakes, and manually operable means to control the power means located adjacent said lever to be operated by the operator of the lever.

7. In an automobile, an emergency or parking brake operating mechanism operable to set the brake independently of the service brake operating means, a lever manually shiftable to apply the said emergency or parking brake mechanism and located for operation from the driver's position, a stationary rack associated with said lever, a pawl movable with the lever and adapted to engage with said rack to hold the lever in position with the vehicle brakes applied, power means operable to release the pawl from the rack to permit of movement of the lever to release the brakes, and manually operable means to control the power means located to be operated by the operator of the lever.

8. In an automobile, an emergency or parking brake operating mechanism operable to set the brake independently of the service brake operating means, a lever manually shiftable to apply the said emergency or parking brake mechanism and located to be operated from the driver's position, a stationary rack associated with said lever, a pawl movable with the lever and adapted to engage with said rack to hold the lever in position with the emergency or parking brake mechanism applied, a suction operated means connected with the pawl, and a manually operated valve located adjacent the driver's position and shiftable to a position establishing a connection between said means and a source of suction whereby to have said means release the pawl from the rack.

9. In combination, a brake rod for operating the emergency or parking brakes of a vehicle, a hand lever connected with said rod for applying the brakes, a piston connected with said rod, a cylinder within which said piston operates, a spring normally maintaining said rod in position where the vehicle brakes are released, a valve shiftable to establish a connection between said cylinder and a source of suction whereby to move the piston and rod to cause application of the brakes, said valve shiftable to admit air to said cylinder to permit the spring to return the vehicle brakes to normal position, adjustable means controlling the admission of air to the cylinder and thereby controlling the rate of movement of the brake rod and piston by said spring, a catch for holding the brakes in the "on" position, and manually controlled suction operated means for releasing the catch to release the brakes.

10. In an automobile emergency or parking brake operating mechanism, a hand lever for applying the brakes, suction operated means for moving the said brakes to applied position, a catch operable to secure the brakes in applied position, means normally retaining said catch in holding position, hand operated means on the lever for releasing the catch, suction operated means to move the catch to release the brakes, and a single valve controlling the application of suction to both of said means.

HARVEY HUBBELL, Jr.

CERTIFICATE OF CORRECTION.

Patent No. 2,156,290.                                                May 2, 1939.

HARVEY HUBBELL, JR.

It is hereby certified that error appears in the printed specification of the above numbered patent requiring correction as follows: Page 2, second column, line 73, claim 3, after the word "holding" insert --said brakes in applied position, means normally holding--; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.